(12) United States Patent
Hsu et al.

(10) Patent No.: US 8,623,099 B2
(45) Date of Patent: Jan. 7, 2014

(54) SYSTEM AND METHOD FOR SECURING DATA WITHIN A STORAGE SYSTEM

(75) Inventors: Windsor Wee Sun Hsu, San Jose, CA (US); Shauchi Ong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 12/130,970

(22) Filed: May 30, 2008

(65) Prior Publication Data

US 2009/0320146 A1 Dec. 24, 2009

Related U.S. Application Data

(63) Continuation of application No. 11/160,806, filed on Jul. 11, 2005.

(51) Int. Cl.
*G06F 21/00* (2013.01)

(52) U.S. Cl.
USPC ...... 726/35; 711/115; 711/162; 711/E12.001; 711/E12.091

(58) Field of Classification Search
USPC ............................................ 711/115; 726/35
See application file for complete search history.

(56) References Cited

U.S. PATENT DOCUMENTS

| 4,940,969 | A | * | 7/1990 | Taylor ........................... 340/653 |
| 5,282,247 | A | | 1/1994 | McLean et al. |
| 5,386,567 | A | * | 1/1995 | Lien et al. ...................... 713/100 |
| 6,745,330 | B1 | | 6/2004 | Maillot |
| 7,480,923 | B2 | * | 1/2009 | Aaron et al. .................. 720/646 |
| 2004/0158674 | A1 | | 8/2004 | Cloutier et al. |
| 2005/0099766 | A1 | | 5/2005 | Fraley et al. |
| 2005/0289289 | A1 | | 12/2005 | Chang |

OTHER PUBLICATIONS

Morris, R. J. T., and B. J. Truskowski. "The Evolution of Storage Systems." IBM Systems Journal, vol. 42, No. 2, 2003.*
U.S. Office Action for U.S. Appl. No. 11/160,806 mailed on Feb. 19, 2009 by Narciso, Victoria F.
U.S. Office Action for U.S. Appl. No. 11/160,806 mailed on Jul. 30, 2009 by Narciso, Victoria F.
U.S. Office Action for U.S. Appl. No. 11/160,806 mailed on Nov. 12, 2009 by Narciso, Victoria F.

* cited by examiner

*Primary Examiner* — David Pearson
*Assistant Examiner* — Narciso Victoria
(74) *Attorney, Agent, or Firm* — Kenneth L. Sherman, Esq.; Michael Zarrabian, Esq.; Sherman & Zarrabian LLP

(57) ABSTRACT

According to the present invention, there is provided a system for securing data with a storage system. The system includes at least one storage device. In addition, the system includes a security mechanism for recognizing an attempt to insert or remove the storage device. Moreover, the system includes a management unit to control the insertion and removal of the storage device.

18 Claims, 3 Drawing Sheets

SYSTEM AND METHOD FOR SECURING DATA WITHIN A STORAGE SYSTEM

FIELD OF THE INVENTION

This present invention relates generally to data security, and, in particular, to securing data within a system such that the data cannot be contaminated, lost, or leaked from the system even when data storage devices such as disk drives are removed from or added to the system.

BACKGROUND OF THE INVENTION

Storage systems are utilized to process and store sensitive data. This sensitive data includes medical records, financial data and even details of weapons simulations. Such data must be securely managed so that it is not contaminated, lost, or improperly leaked. Currently, such data is stored on data storage devices (e.g., disk drives) which tend to be readily replaceable to facilitate repair, failure, and migration to faster, cheaper and larger devices.

The ability to remove devices from the system means that data in the system could become vulnerable when a device is removed. This vulnerability could increase the risk of privacy law violations and/or increase the likelihood that sensitive data will be released.

Furthermore, when storage devices are removed improperly, data stored in the system could be lost. For example, if two disks are removed from a RAID-5 disk array, the data stored in the array will be lost. The removal could be done out of malice or human error. In either case the resulting cost can be enormous. A typical ten hour restore from backup could cost millions of dollars, and cause serious harm to a company.

Moreover, inserting devices into a system could introduce contamination such as foreign data and even viruses. For example, in a system that enforces the WORM (Write Once Read Many) property on rewritable disks, allowing the disks to be removed and inserted back into the system could circumvent the enforcement of the WORM property and cause the system to become contaminated with rewritten data.

SUMMARY OF THE INVENTION

According to the present invention, there is provided a system for securing data with a storage system. The system includes at least one storage device. In addition, the system includes a security mechanism for recognizing an attempt to insert or remove the storage device. Moreover, the system includes a management unit to control the insertion and removal of the storage device.

Also, according to the present invention, there is provided a method for securing data within a storage system. The method includes recognizing an attempt to insert or remove a storage device from a storage system. In addition, the method includes controlling the insertion and removal of the storage device form the storage system.

DETAILED DESCRIPTION

The invention will be described primarily as a system and method for securing data within a storage system. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

Figure 1:
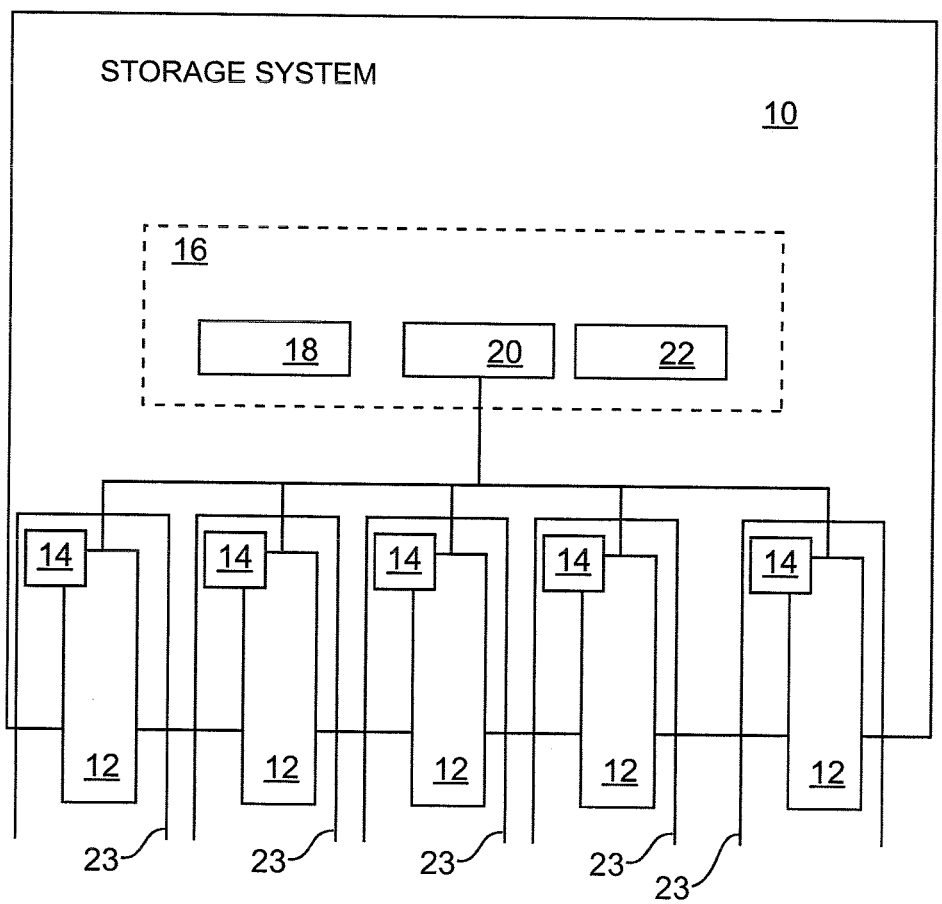
FIG. 1 is a block diagram of a storage system

Referring initially to FIG. 1, a storage system 10 is shown. Storage system 10 can include a plurality of storage devices 12. In one embodiment, storage device 12 is a disk drive. Each storage device 12 is associated with a locking mechanism 14. Storage system 10 includes storage management controller 16. Storage management controller 16 includes security monitoring unit 18, data monitoring unit 20, and initialization unit 22.

Storage management controller 16 is responsible for controlling the insertion and removal of storage device 12. Security monitoring unit 18 is responsible for recognizing and attempt to insert or remove a storage device 12 from storage system 10.

Storage system 10 includes storage device slots 23, where each storage device slot 23 houses one storage device 12. In the exemplary embodiment, storage device 12 is a disk drive.

In an alternate embodiment, storage management controller 16 includes a failure and prediction unit. The failure and prediction unit determines the impact on storage system 10 if storage device 12 is removed. The failure and prediction unit prevents the removal of storage device 12 if it determines that the removal would have a negative impact on storage system 10, where negative impact includes imminent failure of hardware components or software within the storage system.

Figure 2:
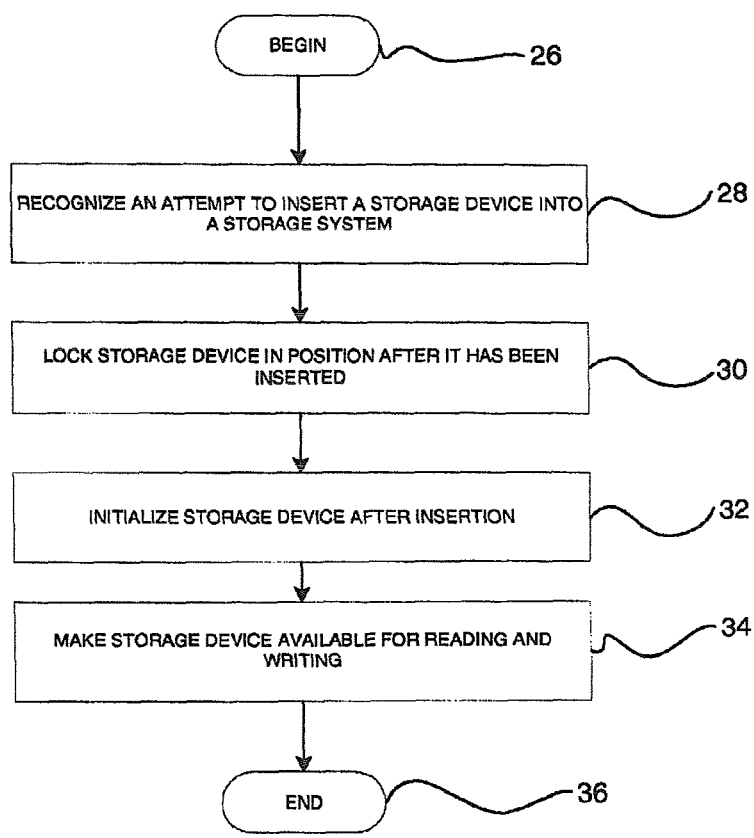
FIG. 2 is a flowchart illustrating a method of attempting to insert storage device into storage system

FIG. 2 is a flowchart illustrating a method 24 of attempting to insert storage device 12 into storage system 10. At block 26, method 24 begins.

At block 28, an attempt to insert storage device 12 into storage system 10 is recognized. The attempt is recognized by security monitoring unit 16.

At block 30, storage device 12 is locked into position. Storage device 12 is locked into position by locking mechanism 14. Locking mechanisms are associated with each of the storage device slots 23. Locking mechanism 14 is moved into position after storage device 12 has been inserted into storage device slot 23, to prevent removal of storage device 12. In the exemplary embodiment, locking mechanism 14 is automatically engaged upon the insertion of storage device 12.

At block 32, storage device 12 is initialized. Storage device 12 is not accessible for reading or writing until it has been initialized. In the exemplary embodiment, initializing the storage device comprises removing all existing data resident on storage device 12 and filling storage device 12 with a predetermined bit pattern. In an alternate embodiment, initializing storage device 12 includes resetting the state of storage device 12 to its initial factory value. In a further alternate embodiment, initializing storage device 12 includes populating storage device 12 with legitimate data currently stored in storage system 10. For example, if a storage device 12 is inserted to replace another storage device 12 in a RAID-5 array, it s initialization would include rebuilding the appropriate data on the inserted storage device 12.

At block 34, storage device 12 is made available for reading and writing.

At block 36, method 24 ends.

Figure 3:
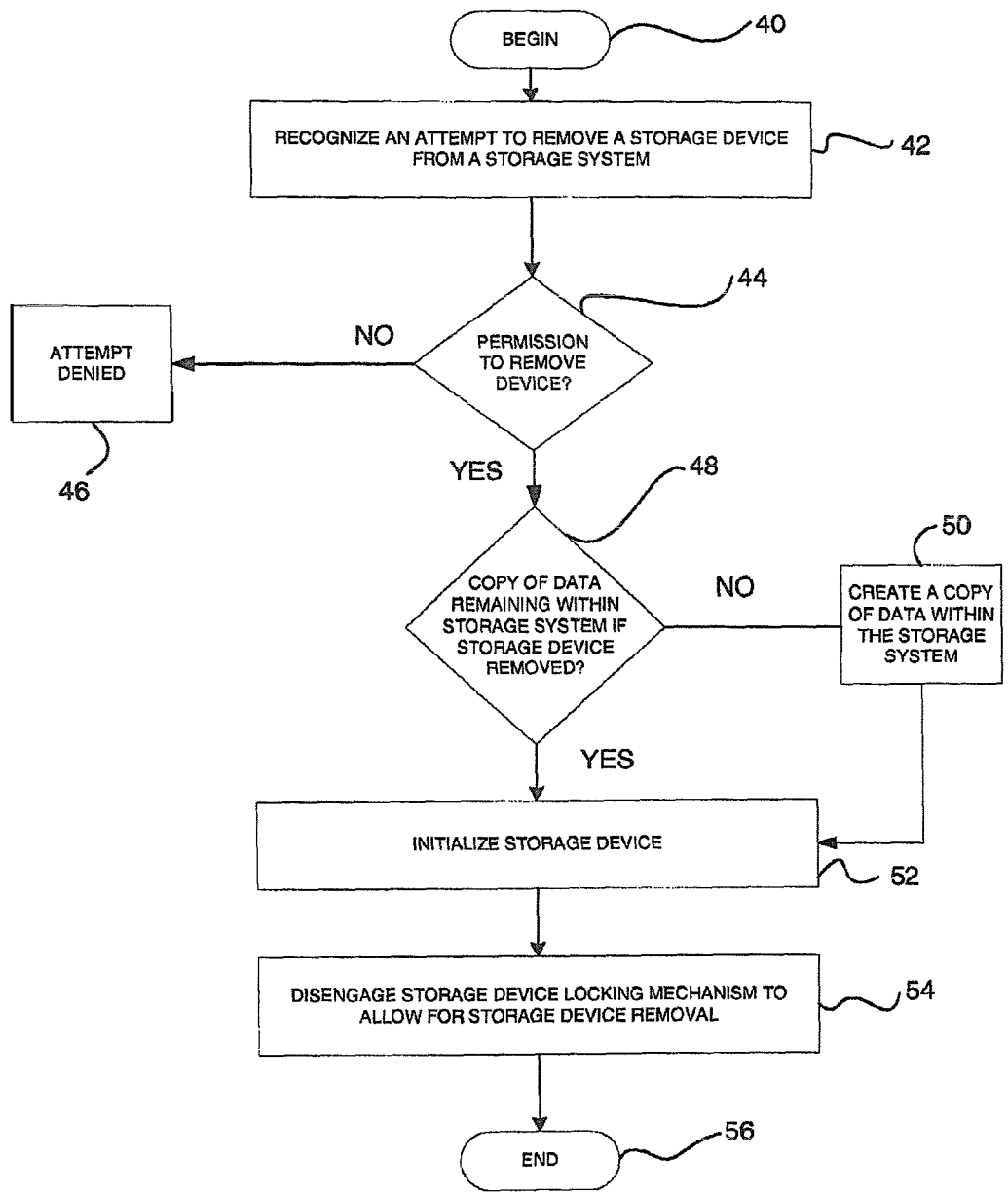
FIG. 3 is a flowchart illustrating a method of attempting to remove storage device from storage system.

FIG. 3 is a flowchart illustrating a method 38 of attempting to remove storage device 12 from storage system 10. At block 40, method 38 begins.

At block 42 an attempt to remove storage device 12 from storage system 10 is recognized.

At block 44 a determination is made as to whether permission to remove storage device 12 has been granted. If no, then at block 45 permission is denied. In one embodiment, a password is required before permission to remove storage device 12 is granted.

At block 48, a determination is made as to whether a copy of data contained within storage device 12 will remain in storage system 10, if storage device 12 is removed. If no, then at block 50 a copy of the data is made and stored within storage system 10. If yes, then at block 52, storage device 12 is initialized.

At block 54, locking mechanism 14 associated with storage device 12 is disengaged to allow for the removal of storage device 12.

At block 56, method 38 ends.

In an alternative embodiment, storage device 12 may not be removed unless the resulting degree of fault tolerance in storage system 10 remains the same.

While the invention has been described using a disk drive as a sample data storage device, it should be apparent that the invention applies to other types of storage devices and to combinations of these devices. These devices include but are not limited to tapes, CDs, DVDs, flash memory, Smart Cards, etc. It should also be apparent that different mechanisms can be used to prevent a device from being removed from the system.

What is claimed is:

1. A system for securing data within a storage system, comprising:
multiple storage devices;
a security monitoring unit that recognizes an attempt to insert or remove any of the multiple storage devices;
a management unit that controls the insertion and removal of the multiple storage devices, wherein the management unit responds to a recognized attempt to remove a storage device of the multiple storage devices by:
determining whether a copy of data on the storage device will remain in the storage system; and
disengaging a locking mechanism associated with the storage device to allow removal of the storage device from the storage system only if a copy of data on the storage device will remain in the storage system; and
a failure and prediction unit, wherein the failure and prediction unit prevents the removal of the storage device from the storage system if the failure and prediction unit determines that the removal would have a negative impact on the storage system, wherein the negative impact is based on prediction of imminent failure of hardware components or software components within the storage system.

2. The system of claim 1 wherein the management unit initializes the storage device after it has been inserted in the storage system, wherein the inserted storage device is not accessible for reading or writing until it has been initialized.

3. The system of claim 1 wherein the storage system contains slots for housing the multiple storage devices, wherein the multiple storage devices comprise disk drive devices.

4. The system of claim 3 wherein the storage device is considered to be inserted into one of the slots contained in the storage system if the storage device communicates with at least one other storage device of the multiple storage devices in the storage system.

5. The system of claim 3 wherein each of the slots contains a separate associated locking mechanism that is automatically moved into position by the management unit to prevent the removal of the storage device after it has been inserted into one of the slots.

6. The system of claim 1 wherein the management unit creates a copy of all data on the storage device and reinitializes the storage device before disengaging the locking mechanism.

7. A computer program product comprising a non-transitory computer usable medium including a computer readable program, wherein the computer readable program when executed on a computer causes the computer to:
recognize an attempt to insert or remove a storage device from a storage device system including multiple storage devices;
control the insertion and removal of the storage device from the storage system, wherein a management unit responds to a recognized attempt to remove the storage device by:
determining whether a copy of data on the storage device will remain in the storage system; and
disengaging a locking mechanism associated with the storage device to allow removal of the storage device from the storage system only if a copy of data on the storage device will remain in the storage system; and
preventing the removal of the storage device from the storage system based on determining that the removal would have a negative impact on the storage system, wherein the negative impact is based on prediction of imminent failure of hardware components or software components within the storage system.

8. The computer program product of claim 7 wherein controlling the insertion of the storage device comprises initializing the storage device before making it available for reading or writing.

9. The computer program product of claim 7 wherein the storage system contains slots for housing the multiple storage devices, wherein the multiple storage devices comprise storage disk drive devices.

10. The computer program product of claim 9 wherein the storage device is considered to be inserted into one of the slots contained in the storage system if the storage device can communicate with at least one other storage device in the storage system.

11. The computer program product of claim 9 wherein each of the slots contains a separate associated locking mechanism that is moved into position to prevent the removal of the storage device after it has been inserted into one of the slots.

12. The computer program product of claim 11 wherein the locking mechanism is automatically engaged upon the insertion of the storage device.

13. The computer program product of claim 11 wherein the storage device is available for reading and storing data only after it has been locked into the slot and it has been initialized.

14. The computer program product of claim 7 wherein the management unit creates a copy of all data on the storage device before disengaging the locking mechanism.

15. The computer program product of claim 14 further comprises reinitializing the storage device before disengaging the locking mechanism associated with the storage device for removal of the storage device from the storage system.

16. A method of deploying a data security system within a storage system, comprising:
- identifying all storage devices within a storage system;
- integrating a security monitoring unit into the storage system that recognizes attempts to insert or remove the identified storage devices;
- integrating a management unit into the storage system that controls the insertion and removal of the identified storage devices, wherein the management unit responds to a recognized attempt to remove the identified storage devices by:
  - determining whether a copy of data on the identified storage devices will remain in the storage system; and
  - disengaging locking mechanisms associated with each of the identified storage devices to allow removal of the identified storage devices from the storage system only if a copy of data on the identified storage devices will remain in the storage system; and
- preventing the removal of the storage device from the storage system based on determining that the removal would have a negative impact on the storage system, wherein the negative impact is based on prediction of imminent failure of hardware components or software components within the storage system.

17. The system of claim 1, wherein the management unit prevents the removal of the storage device from the storage system if a degree of fault tolerance in the storage system will change after the storage device is removed.

18. The system of claim 1, wherein a password is required before permission to remove the storage device is granted.

* * * * *